United States Patent
Rust

(10) Patent No.: US 8,957,119 B2
(45) Date of Patent: Feb. 17, 2015

(54) NON-CHEMICAL, MECHANICAL PROCEDURE FOR THE DEVULCANIZATION OF SCRAP RUBBER AND/OR ELASTOMERS AND APPARATUS THEREFOR

(75) Inventor: Harald Rust, Bochum (DE)

(73) Assignee: Entex Rust & Mitschke GmbH, Bochum (DE)

( * ) Notice: Subject to any disclaimer, the term of this patent is extended or adjusted under 35 U.S.C. 154(b) by 41 days.

(21) Appl. No.: 13/558,880

(22) Filed: Jul. 26, 2012

(65) Prior Publication Data

US 2013/0023639 A1 Jan. 24, 2013

Related U.S. Application Data

(63) Continuation-in-part of application No. PCT/EP2011/000239, filed on Jan. 21, 2011.

(30) Foreign Application Priority Data

Jan. 31, 2010 (DE) .................. 10 2010 006 476

(51) Int. Cl.
*C08J 11/10* (2006.01)
*B29C 47/42* (2006.01)
*B29C 47/82* (2006.01)
*B29C 47/00* (2006.01)

(52) U.S. Cl.
CPC ............... *B29C 47/42* (2013.01); *B29C 47/82* (2013.01); *B29C 47/822* (2013.01); *B29C 47/825* (2013.01); *C08J 11/10* (2013.01); *B29C 47/0009* (2013.01); *B29C 2947/92019* (2013.01); *B29C 2947/92209* (2013.01); *B29C 2947/9238* (2013.01); *C08J 2300/30* (2013.01); *C08J 2319/00* (2013.01); *C08J 2321/00* (2013.01)
USPC ............. 521/45.5; 521/40; 521/40.5; 521/41; 422/132; 422/620

(58) Field of Classification Search
CPC ...... B29C 47/42; B29C 47/82; B29C 47/822; B29C 47/825; B29C 2947/92209; B29C 2947/9238; B29C 2947/92019; C08J 11/06; C08J 2321/00; C08J 2319/00
USPC ............. 521/40, 40.5, 45.5; 528/480, 502 R, 528/502 C, 502 F, 503; 526/64, 325; 422/132, 620
See application file for complete search history.

(56) References Cited

U.S. PATENT DOCUMENTS

| | | |
|---|---|---|
| 4,889,430 A | 12/1989 | Mueller |
| 5,258,413 A | 11/1993 | Isayev |
| 5,731,358 A | 3/1998 | Pillai |
| 5,749,189 A | 5/1998 | Oberg |
| 5,883,140 A | 3/1999 | Fisher et al. |
| 6,133,413 A | 10/2000 | Mouri et al. |
| 6,576,680 B2 | 6/2003 | Ohshima et al. |
| 6,831,109 B1 | 12/2004 | Beirakh et al. |
| 6,956,065 B2 | 10/2005 | Van Duin et al. |
| 6,992,116 B2 | 1/2006 | Benko et al. |
| 7,342,052 B2 | 3/2008 | Fulford et al. |
| 7,476,416 B2 | 1/2009 | Tynan, Jr. et al. |
| 8,218,837 B2 | 7/2012 | Wu |
| 2007/0173622 A1* | 7/2007 | Tynan et al. .............. 526/319 |
| 2010/0160569 A1 | 6/2010 | Meier et al. |

FOREIGN PATENT DOCUMENTS

| | | |
|---|---|---|
| DE | 909041 | 4/1954 |
| DE | 102004048440 | 6/2005 |
| DE | 102007041486 | 5/2008 |
| DE | 102007026173 | 12/2008 |
| DE | 102007000692 | 3/2009 |
| DE | 102007040645 | 3/2009 |
| DE | 102007050466 | 4/2009 |
| DE | 102007058174 | 6/2009 |
| DE | 102008018686 | 10/2009 |
| DE | 102009013839 | 9/2010 |
| DE | 102009019846 | 11/2010 |
| EP | 690091 | 1/1996 |
| EP | 887372 | 12/1998 |
| EP | 1242520 | 9/2002 |

OTHER PUBLICATIONS

Machine translation of DE 10 2007 026 173.*
Machine translation of DE 10 2004 048 440.*

* cited by examiner

*Primary Examiner* — Frances Tischler
(74) *Attorney, Agent, or Firm* — Nils H. Ljungman & Associates

(57) ABSTRACT

Method of devulcanizing rubber and/or elastomers without the need for a chemical agent, in which method the vulcanized rubber and/or elastomers are fed into a planetary roller extruder, which planetary roller extruder has a housing, a central spindle, two groups of planetary roller spindles, and a dispersion ring disposed about the central spindle and between the two groups of planetary spindles. Mechanical and thermal stress is generated on the vulcanized rubber and/or elastomers by kneading and/or crushing the vulcanized rubber and/or elastomers using the central spindle and the planetary spindles, and by forcing the vulcanized rubber and/or elastomers through the dispersion ring, which is designated to substantially restrict passage of the vulcanized rubber and/or elastomers therethrough. The mechanical and thermal stress alone is sufficient to break or destroy the molecular chains or bonds of the vulcanized rubber and/or elastomers.

20 Claims, 1 Drawing Sheet

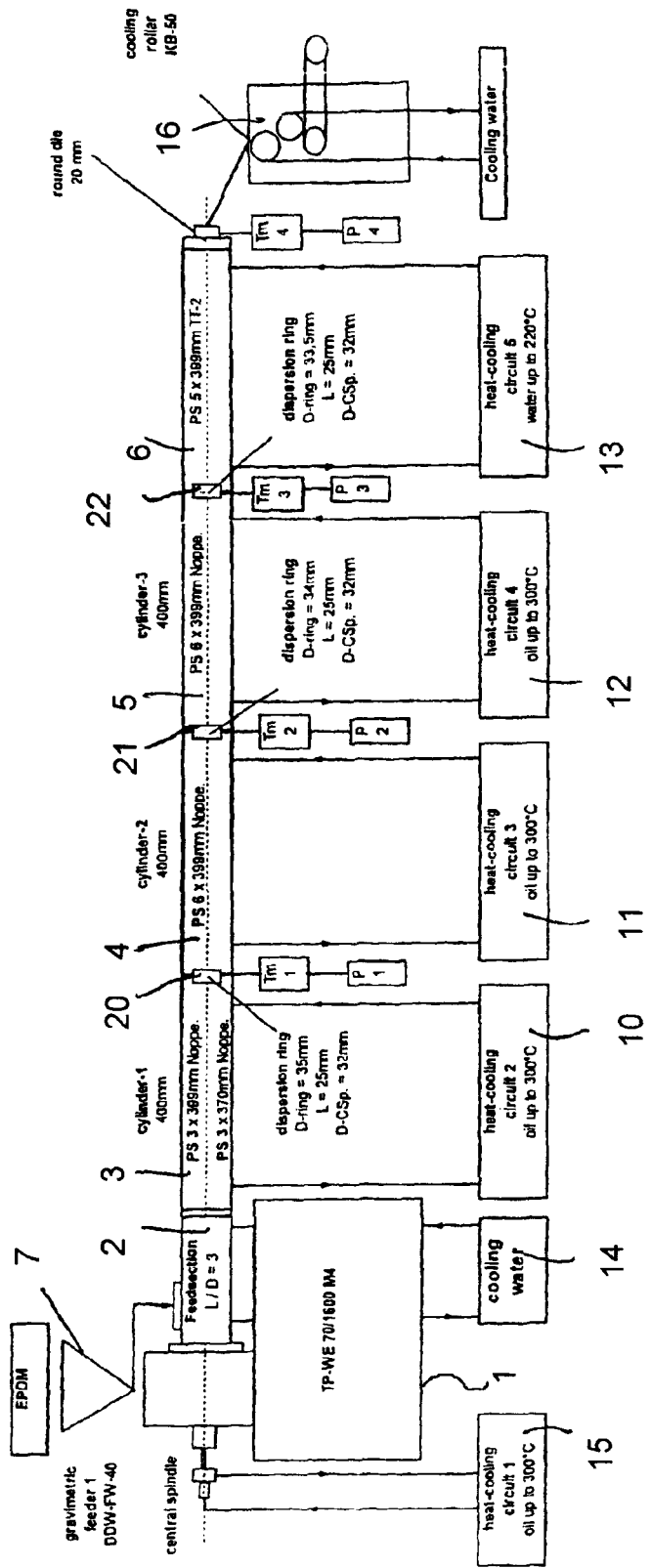

NON-CHEMICAL, MECHANICAL PROCEDURE FOR THE DEVULCANIZATION OF SCRAP RUBBER AND/OR ELASTOMERS AND APPARATUS THEREFOR

CONTINUING APPLICATION DATA

This application is a Continuation-In-Part application of International Patent Application No. PCT/EP2011/000239, filed on Jan. 21, 2011, which claims priority from Federal Republic of Germany Patent Application No. 10 2010 006 476.9, filed on Jan. 31, 2010. International Patent Application No. PCT/EP2011/000239 was pending as of the filing date of this application. The United States was an elected state in International Patent Application No. PCT/EP2011/000239.

BACKGROUND

1. Technical Field

This application relates a non-chemical, mechanical procedure for the devulcanization of scrap rubber and/or elastomers and apparatus therefor.

2. Background Information

Background information is for informational purposes only and does not necessarily admit that subsequently mentioned information and publications are prior art. Rubber consists of or comprises natural rubber and/or artificially produced elastomers the molecules of which have experienced a crosslinking. Amongst other, sulphur-carbon compound and sulphur-sulphur compounds between the molecules are known. Thereby it is also referred to as cross linkings.

Due to the crosslinking the characteristics of the material are changed drastically. This refers especially to the strength, elasticity and the thermal carrying capacity.

Rubber is mostly applied in the automotive industry. The carrying capacity of car tires is legendary.

Depending on the run kilometers of the tires there is a wear condition which is matched with the wear of the profile of the tires. When the profile falls below a certain thickness a tire change must be carried out.

Old tires and scrap rubber respectively occur.

In fact, there are different proposals existing for the chemical treatment of scrap rubber, the expenditure, however, is so high, that nearly no use is made of them. Scrap rubber may be fed to combustion. Thereby the cement industry has proved to be a big consumer. There, scrap rubber as well is burned in the rotary furnaces. The cement rotary furnaces have a long combustion line so that unburned gases will be combusted. Thus, an environmental pollution is excluded.

The cement industry, however, mostly asks for a contribution for the combustion of the scrap tires.

Moreover, the disposal of scrap tires is no longer treated as contemporary.

Therefore, efforts are made since long concerning the recycling of rubber and elastomers.

Thereby different ways are followed.

As per DE60004885T2 modifying agents are used for the devulcanization of hardened (crosslinked) elastomers and rubber. These modifying agents consist totally or partly of adipic acid or oxalic acid. Moreover additives are used which consist of sulphur, zinc oxide and stearic acid.

In DE 909041 edeleanu extracts, which are generated from the crude oil processing, are scheduled as modifying agents. Thereby, e.g. kerosene, nitrobenzene, furfurol, phenol, dichlordiethylene ether are concerned.

The DE 60008279T2 provides amine compounds as devulcanization agent/modifying agent.

DE60215210T2 provides aromatic oil, naphthenic oil or paraffinic oil as devulcanization agent.

Der60306089T2 provides 2-butanol and carbon dioxide as devulcanization agent.

Also DE60120804T2 provides modifying agents. However, the oil is generated out of the recyclate itself.

From the application's view the modifying agents have the disadvantage that the modifying agents remain totally or partly in the recyclate and that they restrict the usability of the recyclate very much.

Also a devulcanization without chemical agents is known. Possibly utilized or adapted for use in this application are microwaves and ultrasonic waves. With the waves a strong mechanical stress of the rubber and the elastomers is generated with which the molecular chain shall be broken open. The mechanical stress can be completed by using heat and high vapour pressure respectively.

Nevertheless, this kind of devulcanization is judged as insufficient, cp. for example DE60120804T2.

Also the application pursues the task to recycle the scrap rubber economically.

Thereby, the embodiments illustrate another way to pursue this goal.

OBJECT OR OBJECTS

An object of the present application is a non-chemical, mechanical procedure for the devulcanization of scrap rubber and/or elastomers and apparatus therefor. Another object of the present application is a non-chemical, mechanical procedure and apparatus therefor to devulcanize scrap rubber and/or elastomers with crosslinking, which are mechanically and/or thermally destructible, by means of an extruder. Yet another object of the present application is a non-chemical, mechanical procedure and apparatus therefor which will devulcanize scrap rubber/or and elastomers the crosslinking of which is based on a sulphur compound.

SUMMARY

This application teaches that mechanical and thermal stress is generated in a planetary roller extruder whereat the planetary roller extruder comprising a housing, planetary spindles and a central spindle; and the central spindle is intermeshing with the planetary spindles and the planetary spindles with an internal toothing of the housing or the internal toothing of an intended liner in the housing so that a revolution of the central spindle causes a rotation of the planetary spindles around the central spindle in the housing, at which the planetary spindles of one section slide with the facing surface at a stop ring of this section, whereat in the planetary roller extruder is at least one dispersion ring intended which reduces the flow cross-section for the rubber and/or the elastomers more than a stop ring creating said mechanical and/or thermal stress.

Thereby, a planetary roller extruder is used.

It is known that single screw extruders and twin screw extruders cause a mechanical stress by which the molecular structure can break. A corresponding machine is described in DE60120804T2 as well as in DE69329245T2 as well as in DE69724239T2.

At the planetary roller extruder, as opposed to a twin screw extruder, a much lesser mechanical stress is considered. Even though the planetary roller extruder are mentioned in some publications as a possible extruder variation, they did not yet become part of production lines for the recycling of rubber and/or elastomers. The low expectation concerning the mechanical stress of molecular chains by means of planetary roller extruders is in accordance with some notes concerning the use of planetary roller extruders for the regeneration of rubber together connected with the note concerning the addition of the above mentioned devulcanization agents.

Anyhow, a sufficient mechanical effect for the devulcanization in planetary roller extruders may be achieved by means of dispersion rings. By means of the dispersion rings the passage cross section for the rubber and/or elastomer respectively, treated in the extruder, will be more reduced than by means of a stop ring. Normally, stop rings have an internal diameter being approximately the same as the diameter built by the axes of the planetary spindles. Different types of construction show also a greater internal diameter.

The dispersion ring intended by embodiments herein has an internal diameter being in one embodiment min. 10% smaller, in another embodiment min. 20% and in yet another embodiment min. 30% smaller than the diametrical pitch of the planetary spindle.

The reduction of the passage cross section can even be extended to that extent that the dispersion ring catches into a groove of the central spindle.

Thereby, the dispersion ring for example can leave even only a gap of a few millimeters, in the extreme case of e.g. one millimeter, open to the bottom of the tooth for the passage of rubber and/or elastomer.

As per the embodiments thereby it can be of advantage to incorporate the groove by a small rate, e.g. the rate of one millimeter, in excess of the bottom of the tooth of the toothing at the central spindle into the central spindle.

In at least one possible embodiment, the procedure according to the application is used for the compounding of scrap rubber being devoid from metallic reinforcing layers. Metallic reinforcing layers are found especially in used tires. Here, steel cores are concerned which keep the tires in the desired shape.

There are different processes suitable for the separation of rubber and metal. Optionally the scrap rubber will be heavily cooled and in this cooled condition comminuted in a mill. In cooled condition the comminution will be easier because the flexibility of rubber decreases. The colder the rubber is the easier becomes the comminution.

According to the embodiments rubber and/or elastomers are fed into the extruder as chips. The medium chip diameter amounts typically to 5 to 40 mm, or more typically are 15 to 30 mm.

The temperature of the material to be treated can be very well adjusted in the planetary roller extruder, because the material to be treated, the rubber and/or elastomer respectively, is rolled out extensively and thin. Thus, the planetary roller extruder acts as a large-scale heat exchanger. Single screw extruders and twin screw extruders of a comparable construction size have a comparatively small heat exchanger area.

The planetary roller extruders have a centrically arranged driven central spindle. Usually the central spindle has on its outside an involute toothing. The toothing will be distinguished according to the tooth modules.

The central spindle is surrounded by a housing which has an internal toothing. The internal toothing has the same tooth module as the external toothing at the central spindle.

Between the housing and the central spindle there are several planetary spindles evenly arranged at the circumference of the central spindle. The planetary spindles have an external toothing with the same module like the central spindle and the toothing of the housing. The planetary spindles intermesh with the central spindle and the internal toothing of the housing.

The rotating planetary spindles slide into conveying direction ahead at a slide ring resp. stop ring so that their circulation is bound in axial direction. With regard to further details of customary planetary roller extruder it is referred for example to the following publications: DE 102009019846, DE 102009013839, DE102008063036, DE 102008018686, DE 102007058174, DE102007050466, DE 102007041486, DE 102007040645.

The used material will be rolled out between the jointly intermeshing teeth into thin layers. Thus, a heavy kneading effect on the scrap rubber is occurring. By the kneading effect heat is supplied to the scrap rubber.

The kneading effect can be influenced by a different number and/or different design of the planetary spindles.

The number of planetary spindles amounts in one embodiment is a min. of 5, in another embodiment is a min. of 6. The larger the diameter of the central spindle, the more planetary spindles are normally provided in one module/section. Thus, 24 and more spindles can easily be used for e.g. bigger construction sizes.

The planetary spindles can be designed for example as conventional spindles, as transversal mixing planetary spindles or as nap rolls as they are described in DE 10 2004 048 440 or U.S. Pat. No. 7,476,416. The conventional spindle has an identical continuous toothing or substantially identical continuous toothing from one end to the other.

The transversal mixing planetary spindle is based on the conventional spindle. Intermittently there are ring-shaped revolving recesses incorporated into the transversal mixing planetary spindles so that at a lateral vies of a spindle a meander contour can bee seen.

The nap spindle as well is based on a conventional spindle. Thereby, however, the spindle is furnished in addition to the conventional toothing with a counter-rotating toothing, which is crossing the conventional toothing. That means, by means of the counter-rotating toothing there are cut gaps of specific shape and sequence into the teeth of the conventional toothing. The remaining teeth of the conventional toothing have a nap shape. Due to the gaps the conveying effect of the spindles is reduced whereas the kneading effect increases. Moreover, the kneading process with naps differs in the kneading process with the conventional spindle and the transversal mixing planetary spindle.

The publications mentioned with regard to the transversal mixing spindles and the nap spindles describe further useful details of planetary roller extruders which are suitable for a devulcanization according to the application.

The temperature of the material to be treated is brought in the planetary roller extruder to the desired level for the devulcanization by means of heat supply and cooling respectively.

According to the application the level is between 250 and 350 degree Celsius in one embodiment, and between 250 and 300 degree Celsius in another embodiment.

The kneading effect and the heat effect are maintained for a duration of 1 to 4 min. in one embodiment, and 1.5 to 3 min. in another embodiment. This duration corresponds to the length of stay in the planetary roller extruder.

At kneading and heating of the scrap rubber according to the application the sulphur compound is blown up. The sulphur compound enters into a gaseous condition. The gas is exhausted. With regard to the extruder this is referred to as degassing.

The exact determination of the material-dependent respectively correct kneading effect and temperature can be achieved by alteration of the processing time and alteration of the temperature during a few tests on basis of the test results.

At correct devulcanization it occurs after correspondent duration of treatment/stay of rubber and/or elastomers a fluffy material without noteworthy strength.

At a too high temperature the overheating is visually evident on the material to be treated, e.g. as cured.

At a too low temperature the crosslinking will not be neutralized sufficiently. The discharged material is indeed flexible, but shows at least partly its strength.

The planetary roller extruder is especially suitable for the desired heating of scrap rubber when the housing has in the known manner at the inner side a liner which is equipped central spindle-sided with the described internal toothing and outside with a same or another toothing. Often the liner is shrunk into the housing. Thereby the housing is closing the flights of the outside toothing. Thus, these flights can be used as channels.

In one embodiment, these channels are connected at the ends of the housing by means of an annular channel. One of the annular channels is provided for the feed side and is connected with a feed line. The other channel is provided for the discharge side and connected with a discharge line. Both lines are part of a heating-cooling. Oil serves as heating-cooling agent.

The oil is pumped through the channels.

Depending on the oil temperature this causes a cooling or heating.

Depending on the material properties of the scrap rubber an extruder can be used the length of which is sufficient for execution of the whole devulcanization in one extruder. That means that then the extruder has a length in which the total requested dwell time can be represented. In one embodiment, however, extruders are used which are composed of jointly aligned modules/sections. Each module has an own housing and own planetary spindles and an own stop ring. In one embodiment, a common central spindle is provided for all jointly aligned modules/sections.

Optionally the modules/sections have totally or partly a length of smaller/equal 800 mm in one embodiment, of smaller/equal 600 mm in another embodiment and of smaller/equal 500 mm in yet another embodiment.

By means of shorter lengths of individual or all modules/sections an adjustment to different temperature requirements can occur. Moreover, at a longer extruder module/extruder section the heating-cooling can be split up into different sections which are in series in axial direction.

But also module lengths of more than 1000 mm, e.g. 1400 mm can be applied.

The greater the extruder diameter the greater becomes normally the throughput. By increase of the throughput the dwell time of rubber and/or elastomers in the extruder can be extended which requires in a longer extruder length.

The module construction/section construction offers also at the planetary roller extruder the possibility to alter the kneading effect by alteration of the toothing resp. by mounting modules with different toothing.

As far as the same modules are already provided an alteration of the kneading effect and the processing time can be still achieved afterwards by changing the planetary spindles resp. by reducing the number of planetary spindles. At a change of the material to be processed this may include a substantial practical advantage.

In this sense, nap spindles can be combined with conventional spindles and/or transversal mixing planetary spindles. The nap spindles represent the one extreme for the processing of rubber in the extruder, the effect of transversal mixing spindles diverges from this. In case it appears that the processing time is too long in the above sense, individual or several nap spindles can be changed with transversal mixing spindles or conventional spindles. Optionally, also transport and drying spindles will be used also for shortening of the processing time, as they are described in EP702739. That means, individual or several nap spindles are exchanged with transport and drying spindles.

The transport and drying spindles as well are based on the conventional spindles. Thereby, individual or several teeth are milled out of the conventional toothing of a spindle.

Also a different length of the planetary spindles is possible at the processing of rubber or the like so that the material fed into a planetary roller module is all in all seized gently and not abruptly by the toothing.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The application is explained in greater detail below with reference to the accompanying drawings. The drawing displays an extrusion line for the procedure according to embodiments for the application of scrap rubber in which:

FIG. 1: shows an embodiment of an extrusion line, comprising of different sections 2,3,4,5,6.

DESCRIPTION OF EMBODIMENT OR EMBODIMENTS

FIG. 1 shows sections 3,4,5,6 thereof are planetary roller modules. To the different planetary roller modules belong internally toothed cylindrical housings, non-displayed planetary spindles and a non-displayed central spindle. Here, for all planetary roller modules one common central spindle is provided, i.e. the central spindle passes through all planetary roller modules. In all planetary roller modules six planetary spindles each are provided. Thereby the planetary spindles of the planetary roller modules 3,4,5 are designed as nap spindles, whereas the planetary spindles of the planetary roller module 6 are designed as transport and drying spindles. In one embodiment, the planetary spindles of the planetary roller modules 4,5,6 have all the same length of 399 mm; three planetary spindles of the planetary roller module 3, however, are provided with this length, the other three planetary spindles are shorter, i.e. 370 mm.

All planetary spindles slide in non-displayed manner on conventional stop rings.

A feeding part, designed as single screw extruder module, belongs as well to the extrusion line. According to this only one screw is rotating in the feeding part.

In the exemplary embodiment the above described common central spindle proceeds as single screw in the feeding part until the drive 1. In the exemplary embodiment the scrap rubber is dosed into the feeding part 2 as chips with a medium diameter of 15 to 30 mm. The dosing is marked with 7.

During the devulcanization operation the planetary roller modules 3,4,5 are maintained on a temperature of 300 degree Celsius by means of oil coolers 10,11,12. The temperature is dependant on the material being processed.

After discharge out of planetary roller module 5 the devulcanized scrap rubber is cooled down to 220 degree Celsius in planetary roller module 6 before it leaves in crumb form the extrusion line and is cooled down to room temperature in a water cooler 16.

For the cooling a water cooler 13 is provided at the planetary roller module 6.

Also the feeding part 2 is equipped with a water cooler 14.

The cooling temperatures at the feeding part and after the devulcanization are depending on the material as well.

Moreover, an internal cooling of the central spindle is provided in the exemplary embodiment. The appropriate cooler 15 is like the coolers 10,11,12 an oil cooler and is adjusted to a temperature of 300 degree Celsius.

The devulcanization is caused by the mechanical and the thermal stress of the scrap rubber in the extrusion line.

Also the dispersion rings 20,21,22 contribute to the mechanical stress in the planetary roller modules 3,4,5.

In the exemplary embodiment the dispersion rings are arranged in conveying direction of the scrap rubber through the line behind the non-displayed stop rings.

Thereby, the internal diameter of the dispersion rings 20,21,22 is smaller than the outer diameter of the central spindle. The dispersion rings 20,21,22 catch into the non-displayed grooves in the central spindle so that the tooth spaces between the teeth of the central spindle are closed except a narrow gap at the tooth root. Moreover, the dispersion rings 20,21,22 are hold between the correspondent ends of the planetary roller modules so that also the housing surrounding the central spindle is closed and the scrap rubber is forced to pass though the narrow gap. In the exemplary embodiment the gap has an opening width of 2 mm. This causes an extreme forming or deformation and an extreme mechanical stress.

In detail the dispersion ring 20 is provided between the planetary roller modules 3 and 4, the dispersion ring 21 between the planetary roller modules 4 and 5 and the dispersion ring 22 between the planetary roller modules 5 and 6.

The fixing of the dispersion rings 20,21,22 is executed during the joining of the cylindrical housings of the planetary roller modules 3,4,5,6.

The planetary roller modules 3,4,5,6 have at their end conventional flanges which are screwed against each other by means of tensioning screws.

The feeding part 2 as well has flanges which may be conventional. With these flanges the feeding part is mounted at the housing of drive 1 on the one hand and on the other hand with the planetary roller module 3.

In order to facilitate the assembly it is provided that the dispersion rings 20,21,22 of the exemplary embodiment, which are catching into the grooves of the central spindle, are composed out of two halves.

The assembly of the dispersion ring 20 is explained in the following. The assembly of the other dispersion rings 21,22 takes place accordingly.

At first, after the assembly of the housing of the feeding part, the central spindle with its as single screw designed end is moved into the housing of the feeding part and connected to the drive.

Then the housing of the planetary roller module 3 is moves over the central spindle and fixed to the housing of the feeding part. Then the positioning of the planetary spindles of the planetary roller module 3 follows. For this the planetary spindles are turned into their destined position between housing and central spindle. The position of the planetary spindles comprises equal distribution at the circumference of the central spindle and the already described mesh of the teeth of the planetary spindles with the internal toothing of the housing and the outer toothing of the central spindle. After positioning of the planetary spindles the stop ring for the planetary spindles is moved over the central spindle and a centrical opening of the end of the housing of the planetary roller module. The stop ring has a hard metal or other hard coating in the contact area with the planetary spindles as wear protection.

After positioning of the stop ring the dispersion ring 20, consisting of or comprising two halves, will be mounted at the stop ring of the line. Thereby, the halves will be moved together into a groove of the central spindle. Then the centering of the dispersion ring occurs by means of a one-piece supporting ring which can be moved over the central spindle and on its part finds in the same housing opening like the stop ring a centering in the planetary roller module 3. The supporting ring is measured in that way that it sticks out of the end of the housing opening of the planetary roller module 3 and thus represents a centering for the successive housing of the planetary roller module 4 which shall be mounted. The housing of the planetary roller module 4 will then be fixed to the housing of the planetary roller module 3 in the above described manner. This assembly causes at the same time a fastening of the stop ring, the dispersion ring and the supporting ring.

The following patents, patent applications or patent publications, are hereby incorporated by reference as if set forth in their entirety herein except for the exceptions indicated herein: DE60004885T2, DE 909041, DE 60008279T2, DE60215210T2, DE60306089T2, DE60120804T2, DE60120804T2, DE60120804T2, DE69329245T2, DE69724239T2, DE 102009019846, DE 102009013839, DE102008063036, DE 102008018686, DE 102007058174, DE102007050466, DE 102007041486, DE 102007040645. DE 10 2004 048 440 or U.S. Pat. No. 7,476,416, EP702739.

One feature or aspect of an embodiment is believed at the time of the filing of this patent application to possibly reside broadly in a procedure for devulcanization of rubber and/or elastomers, the molecular chains of which are destructible by mechanical and thermal stress, wherein the mechanical and thermal stress is generated in a planetary roller extruder whereat the planetary roller extruder comprising a housing, planetary spindles and a central spindle; and the central spindle is intermeshing with the planetary spindles and the planetary spindles with an internal toothing of the housing or the internal toothing of an intended liner in the housing so that a revolution of the central spindle causes a rotation of the planetary spindles around the central spindle in the housing, at which the planetary spindles of one section slide with the facing surface at a stop ring of this section, whereat in the planetary roller extruder is at least one dispersion ring intended which reduces the flow cross-section for the rubber and/or the elastomers more than a stop ring creating said mechanical and/or thermal stress.

Another feature or aspect of an embodiment is believed at the time of the filing of this patent application to possibly reside broadly in a procedure for devulcanization of rubber and/or elastomers, wherein rubber and/or elastomers comprise rubber and/or elastomers the molecular chains of which are destructible by mechanical and thermal stress which rubber and/or elastomers comprise a sulphur compound between the molecules are stressed for the duration of to 4 min. at a temperature of 200 to 350 degree Celsius for destruction of the molecular chains or bonds.

Yet another feature or aspect of an embodiment is believed at the time of the filing of this patent application to possibly reside broadly in a procedure for devulcanization of rubber and/or elastomers, wherein a kneading is executed for the duration of to 3 min. of the rubber to be devulcanized or of the elastomers to be devulcanized.

Still another feature or aspect of an embodiment is believed at the time of the filing of this patent application to possibly reside broadly in a procedure for devulcanization of rubber and/or elastomers, wherein kneading of the rubbers to be devulcanized and/or the elastomers to be devulcanized is executed at a temperature of 250 to 300 degree Celsius.

A further feature or aspect of an embodiment is believed at the time of the filing of this patent application to possibly reside broadly in a procedure for devulcanization of rubber and/or elastomers, wherein the rubber and/or the elastomers will be cooled down after the devulcanization to a temperature which is at least 10% below the temperature of the devulcanization in degrees Celcius in one embodiment, and, min. 15% below the temperature of devulcanization in degrees Celcius in another embodiment.

Still another feature or aspect of an embodiment is believed at the time of the filing of this patent application to possibly reside broadly in a procedure for devulcanization of rubber and/or elastomers, wherein the rubber and/or the elastomers will be cooled down after the devulcanization to a temperature which is at least 10% below the temperature of the devulcanization, min. 15% below the temperature of devulcanization.

Another feature or aspect of an embodiment is believed at the time of the filing of this patent application to possibly reside broadly in a procedure for devulcanization of rubber and/or elastomers, wherein a cooling device is downstream from the extruder which is provided for the devulcanization.

Yet another feature or aspect of an embodiment is believed at the time of the filing of this patent application to possibly reside broadly in a procedure for devulcanization of rubber and/or elastomers, wherein a planetary roller extruder is used for the devulcanization which is composed of minimum two sections in one embodiment, and composed of three sections in another embodiment, whereat at least between two sections a dispersion ring is provided which is located in the extruder housing and surrounds the central spindle.

Still another feature or aspect of an embodiment is believed at the time of the filing of this patent application to possibly reside broadly in a procedure for devulcanization of rubber and/or elastomers, wherein the dispersion ring has an internal diameter being smaller than the diameter on which the centre axles of the planetary spindles are rotating around the central spindle whereat the difference of the diameters amounts to min. 10% in one embodiment, min. 20% in another embodiment and min. 30% in yet another embodiment of the pitch diameter of the planetary spindles.

A further feature or aspect of an embodiment is believed at the time of the filing of this patent application to possibly reside broadly in a procedure for devulcanization of rubber and/or elastomers, wherein a dispersion ring is used the internal diameter of which is smaller than the outer diameter of the central spindle, whereat in the central spindle there is provided a groove for the passage of the extruded rubbers and/or of the elastomers, the free passage cross section of which is smaller, min 10% in one embodiment, min 20% in another embodiment than the passage cross section formed by the gaps between the teeth of the central spindle when the internal diameter of the dispersion ring is equal to the outer diameter of the central spindle.

Another feature or aspect of an embodiment is believed at the time of the filing of this patent application to possibly reside broadly in a procedure for devulcanization of rubber and/or elastomers, wherein a dispersion ring is used, comprising min. two parts in one embodiment, and two halves in another embodiment so that the dispersion ring can be put together around the central spindle.

Yet another feature or aspect of an embodiment is believed at the time of the filing of this patent application to possibly reside broadly in a procedure for devulcanization of rubber and/or elastomers, wherein extruders are used which are consisting of or comprising several sections, a common central spindle is provided for the different sections, whereat the central spindle is driven via a motor and gear, whereat the housings of the extruder sections are mounted aligned successively and together at the motor housing and gear housing respectively and are fixed together at the correspondent ends and whereat the central spindle is mounted before the first dispersion ring catching into a groove of the central spindle is mounted, and whereat the motor-sided and gear-sided planetary spindles provided to be located in front of the dispersion ring are mounted before the dispersion ring is mounted, whereat the dispersion ring is positioned between two sections of the extruder housing, so that it catches into the groove in the extruder spindle which is provided for the dispersion ring and which is fixed between the extruder housings at the mounting of the extruder housings.

Still another feature or aspect of an embodiment is believed at the time of the filing of this patent application to possibly reside broadly in a procedure for devulcanization of rubber and/or elastomers, wherein with the stop ring a one-piece dispersion ring is used.

A further feature or aspect of an embodiment is believed at the time of the filing of this patent application to possibly reside broadly in a procedure for devulcanization of rubber and/or elastomers, wherein in relation to the stop ring a separate dispersion ring is used.

Another feature or aspect of an embodiment is believed at the time of the filing of this patent application to possibly reside broadly in a procedure for devulcanization of rubber and/or elastomers, wherein at multi-part dispersion rings a supporting ring as fixture of the dispersion ring is used.

Yet another feature or aspect of an embodiment is believed at the time of the filing of this patent application to possibly reside broadly in a procedure for devulcanization of rubber and/or elastomers, wherein a planetary roller extruder is used, the planetary spindles of which consists at least partly of or comprises at least partly transversal mixing planetary spindles or nap spindles or transport and drying spindles.

Still another feature or aspect of an embodiment is believed at the time of the filing of this patent application to possibly reside broadly in a procedure for devulcanization of rubber and/or elastomers, wherein an extruder is used, composed of sections/modules, the length of which is adapted to the length of stay in the extruder of the material to be treated.

A further feature or aspect of an embodiment is believed at the time of the filing of this patent application to possibly reside broadly in a procedure for devulcanization of rubber and/or elastomers, wherein the kneading effect and the length of stay in the extruder is adapted by the change of planetary spindles.

Another feature or aspect of an embodiment is believed at the time of the filing of this patent application to possibly reside broadly in a procedure for devulcanization of rubber and/or elastomers, wherein oil-cooled planetary roller extruders are used for the extruder sections which are provided for the devulcanization.

Yet another feature or aspect of an embodiment is believed at the time of the filing of this patent application to possibly reside broadly in a procedure for devulcanization of rubber and/or elastomers, wherein a water-cooled extruder section is provided for the cooling of the rubber and/or the elastomers after the devulcanization.

Still another feature or aspect of an embodiment is believed at the time of the filing of this patent application to possibly reside broadly in a procedure for devulcanization of rubber and/or elastomers, wherein the rubber and/or elastomers to be devulcanized are used in the planetary roller extruder as chips with a medium diameter of to 40 mm in one embodiment, and to 30 mm in another embodiment.

A further feature or aspect of an embodiment is believed at the time of the filing of this patent application to possibly reside broadly in a procedure for devulcanization of rubber and/or elastomers, wherein planetary spindles of different lengths are used in the extruder sections.

Another feature or aspect of an embodiment is believed at the time of the filing of this patent application to possibly reside broadly in a procedure for devulcanization of rubber and/or elastomers, wherein the pressure and temperature of the rubber and/or the elastomers can be measured at the dispersion rings.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state Some examples of which may possibly be used in at least one possible embodiment of the present application may possibly not be used or useable in any one or more embodiments of the application.

The sentence immediately above relates to patents, published patent applications and other documents either incorporated by reference or not incorporated by reference.

All of the patents, patent applications or patent publications, except for the exceptions indicated herein, which were cited in the INTERNATIONAL SEARCH REPORT mailed on Apr. 20, 2011, and/or cited elsewhere, as well as the INTERNATIONAL SEARCH REPORT document itself, are hereby incorporated by reference as if set forth in their entirety herein except for the exceptions indicated herein, as follows: DE 10 2007 026173 A1 (RHEIN CHEMIE RHEINAU) and DE 38 15 061 C1 (HERMANN BERSTORFF).

The patents, patent applications, and patent publications listed above in the preceding paragraph are herein incorporated by reference as if set forth in their entirety except for the exceptions indicated herein. The purpose of incorporating U.S. patents, Foreign patents, publications, etc. is solely to provide additional information relating to technical features of one or more embodiments, which information may not be completely disclosed in the wording in the pages of this application.

Words relating to the opinions and judgments of the author of all publications related herein and not directly relating to the technical details of the description of the embodiments therein are not incorporated by reference.

The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more embodiments of the patents, patent applications, and patent publications, are not considered to be incorporated by reference herein for any of the patents, patent publications, or other documents recited herein.

The corresponding foreign and international patent publication applications, namely, Federal Republic of Germany Patent Application No. 10 2010 006 476.9, filed on Jan. 31, 2010, having inventor Harald RUST, and DE-OS 10 2010 006 476.9 and DE-PS 10 2010 734 006 476.9, and International Application No. PCT/EP2011/000239, filed on Jan. 21, 2011, having WIPO Publication No. WO2011/091966 A1 and inventor Harald RUST, are hereby incorporated by reference as if set forth in their entirety herein, except for the exceptions indicated herein, for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, except for the exceptions indicated herein, are hereby incorporated by reference as if set forth in their entirety herein except for the exceptions indicated herein.

The purpose of incorporating the corresponding foreign equivalent patent applications, that is, PCT/EP2011/000239 and Federal Republic of Germany Patent Application No. 10 2010 006 476.9, is solely for the purpose of providing a basis of correction of any wording in the pages of the present application, which may have been mistranslated or misinterpreted by the translator. However, words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned word in this sentence, when not used to describe technical features of one or more embodiments of the patents, patent applications, and patent publications, are not generally considered to be incorporated by reference herein.

Statements made in the original foreign patent applications PCT/EP2011/000239 and DE 10 2010 006 476.9 from which this patent application claims priority which do not have to do with the correction of the translation in this patent application are not to be included in this patent application in the incorporation by reference.

Any statements about admissions of prior art in the original foreign patent applications PCT/EP2011/000239 and DE 10 2010 006 476.9 are not to be included in this patent application in the incorporation by reference, since the laws relating to prior art in non-U.S. Patent Offices and courts may be substantially different from the Patent Laws of the United States.

All of the references and documents cited in any of the documents cited herein, except for the exceptions indicated herein, are hereby incorporated by reference as if set forth in their entirety herein except for the exceptions indicated herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A method of devulcanizing rubber and/or elastomers comprising the steps of:
    feeding vulcanized rubber and/or elastomers into a planetary roller extruder, which planetary roller extruder comprises a housing, a central spindle, two groups of planetary spindles, and a dispersion ring disposed about said central spindle and between said two groups of planetary spindles;
    operating said planetary roller extruder by rotating said central spindle about its rotational axis, and thereby both rotating said planetary spindles about each of their rotational axes and revolving said planetary spindles about said central spindle;
    generating mechanical and thermal stress on said vulcanized rubber and/or elastomers by:

kneading and/or crushing of said vulcanized rubber and/or elastomers by said central spindle and said planetary spindles, and forcing said vulcanized rubber and/or elastomers through said dispersion ring, which is configured to substantially restrict passage of said vulcanized rubber and/or elastomers therethrough; and breaking or destroying the molecular chains or bonds of said vulcanized rubber and/or elastomers solely by said mechanical and thermal stress.

2. The method according to claim 1, wherein:
said central spindle comprises a plurality of teeth with grooves therebetween, the ends of which teeth define an outer diameter of said central spindle; and
said dispersion ring has an internal diameter that is smaller than the outer diameter of said central spindle, such that the open cross-section of said grooves is reduced by at least 10%.

3. The method according to claim 2, wherein said dispersion ring has an internal diameter being at least 10% smaller than the diameter of the path of travel on which the center axles of said planetary spindles are revolving around said central spindle.

4. The method according to claim 3, wherein said rubber and/or elastomers are thermally stressed by heating for 1 to 4 minutes at a temperature of 200 to 350 degree Celsius for destruction of the molecular chains or bonds.

5. The method according to claim 4, wherein said rubber and/or elastomers are mechanically stressed by kneading for 1.5 to 3 for destruction of the molecular chains or bonds.

6. The method according to claim 5, wherein during said step of kneading is performed at a temperature of 250 to 300 degree Celsius.

7. The method according to claim 5, wherein the pressure and temperature of the rubber and/or the elastomers can be measured at the dispersion rings.

8. The method according to claim 7, wherein said planetary roller extruder comprises at least one additional group of said planetary spindles and at least one additional dispersion ring, wherein at least one of said dispersion rings is disposed between each adjacent group of planetary spindles.

9. The method according to claim 8, wherein said method further comprises cooling down said rubber and/or elastomers after devulcanization to a temperature which is at least 10% below the temperature of the devulcanization in degrees Celsius.

10. The method according to claim 9, wherein:
each of said dispersion rings comprises a multi-part ring divided into at least two parts that are held together by a supporting ring; and said planetary roller extruder comprises stop rings, each of which is either integrally formed with or separate from a corresponding one of said dispersion rings.

11. The method according to claim 10, wherein said vulcanized rubber and/or elastomers are fed into said planetary roller extruder as chips with a medium diameter of 5 to 40 millimeters.

12. The method according to claim 1, wherein:
said central spindle comprises a plurality of teeth with grooves therebetween, the ends of which teeth define an outer diameter of said central spindle; and
said dispersion ring has an internal diameter that is smaller than the outer diameter of said central spindle, such that the open cross-section of said grooves is reduced by at least 20%.

13. The method according to claim 2, wherein said internal diameter is configured such that a gap of a few millimeters is formed between said dispersion ring and the bottoms of said grooves at the bases of said teeth.

14. The method according to claim 2, wherein said internal diameter is configured such that a gap of one or two millimeters is formed between said dispersion ring and the bottoms of said grooves at the bases of said teeth.

15. The method according to claim 1, wherein said dispersion ring has an internal diameter being at least 10% smaller than the diameter of the path of travel on which the center axles of said planetary spindles are revolving around said central spindle.

16. The method according to claim 1, wherein said dispersion ring has an internal diameter being at least 20% smaller than the diameter of the path of travel on which the center axles of said planetary spindles are revolving around said central spindle.

17. The method according to claim 1, wherein said dispersion ring has an internal diameter being at least 30% smaller than the diameter of the path of travel on which the center axles of said planetary spindles are revolving around said central spindle.

18. The method according to claim 2, wherein said dispersion ring extends into said grooves of said central spindle to reduce the open cross-section of said grooves to a narrow gap at the bases of said teeth.

19. The method according to claim 3, wherein said dispersion ring extends into said grooves of said central spindle to reduce the open cross-section of said grooves to a narrow gap at the bases of said teeth.

20. The method according to claim 14, wherein said dispersion ring extends into said grooves of said central spindle to reduce the open cross-section of said grooves to said gap.

* * * * *